United States Patent
Kwon et al.

(10) Patent No.: US 9,139,160 B2
(45) Date of Patent: Sep. 22, 2015

(54) ACTIVE SEAT BELT APPARATUS AND METHOD

(71) Applicant: HYUNDAI MOBIS Co., Ltd., Yongin-si, Gyeonggi-do (KR)

(72) Inventors: Young Joon Kwon, Yongin-si (KR); Myoung Hun Kuem, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/275,975

(22) Filed: May 13, 2014

(65) Prior Publication Data

US 2014/0336879 A1 Nov. 13, 2014

(30) Foreign Application Priority Data

May 13, 2013 (KR) .......... 10-2013-0053973

(51) Int. Cl.
*B60R 22/00* (2006.01)
*B60R 22/34* (2006.01)
*B60R 22/02* (2006.01)

(52) U.S. Cl.
CPC ........... *B60R 22/34* (2013.01); *B60R 2022/029* (2013.01)

(58) Field of Classification Search
CPC ........ B60R 22/48; B60R 22/02; B60R 22/44; B60R 2022/4808; B60R 2022/4833
USPC ............. 701/45; 297/474; 180/282; 280/735, 280/806, 807
See application file for complete search history.

(56) References Cited

U.S. PATENT DOCUMENTS 5,788,281 A * 8/1998 Yanagi et al. .................. 280/806
2011/0148176 A1 * 6/2011 Bolton et al. .................. 297/474

* cited by examiner

*Primary Examiner* — Gertrude Arthur Jeanglaude
(74) *Attorney, Agent, or Firm* — Paratus Law Group, PLLC

(57) ABSTRACT

Provided is an active seat belt apparatus, including: a motor which is driven to fasten or unfasten an active seat belt; a motor driving unit which includes the motor and drives the motor; a current measuring unit which measures a value of a current of the motor driving unit in order to determine whether to perform or stop a belt parking function when the active seat belt is unfastened; and a control unit which sends a signal for performing the belt parking function to the motor when the value of the current measured by the current measuring unit is smaller than a limit current value and sends a signal for stopping the belt parking function to the motor when the value of the current measured by the current measuring unit is larger than the limit current value.

12 Claims, 5 Drawing Sheets

ACTIVE SEAT BELT APPARATUS AND METHOD

CROSS REFERENCE TO PRIOR APPLICATIONS

The present application claims priority under 35 U.S.C. §119 to Korean Patent Application No. 10-2013-0053973 (filed on May 13, 2013), which is hereby incorporated by reference in its entirety.

TECHNICAL FIELD

The present invention relates to an active seat belt apparatus and a method of operating the same, and more particularly, to an active seat belt apparatus having a belt parking function and a method of operating the same.

BACKGROUND ART

A seat belt which is generally mounted in a vehicle is to fix a position of a passenger to a seat while a vehicle is being driven to prevent a secondary injury caused by an impulsive force at the time of impact. In recent years, an active seat belt which includes a motor to apply an appropriate restrictive force to the seat belt is applied to a vehicle.

SUMMARY

The present invention has been made in an effort to provide an active seat belt apparatus which improves a belt parking function and a method of operating the same.

Problems of the present invention are not limited to the above-mentioned problems, and other problems, which are not mentioned above, can be clearly understood by those skilled in the art from the following descriptions.

An exemplary embodiment of the present invention provides an active seat belt apparatus, including: a motor which is driven to fasten or unfasten an active seat belt; a motor driving unit which includes the motor and drives the motor; a current measuring unit which measures a value of a current of the motor driving unit in order to determine whether to perform or stop a belt parking function when the active seat belt is unfastened; and a control unit which sends a signal for performing the belt parking function to the motor when the value of the current measured by the current measuring unit is smaller than a limit current value and sends a signal for stopping the belt parking function to the motor when the value of the current measured by the current measuring unit is larger than the limit current value.

Another exemplary embodiment of the present invention provides a method of operating an active seat belt apparatus, including: measuring a current of a motor driving unit when a belt parking operation is performed; comparing the measured current value with a limit current value; performing a belt parking function when the measured current value is smaller than the limit current value; and stopping a belt parking function when the measured current value is larger than the limit current value.

Other detailed matters of the embodiments are included in the detailed description and the drawings.

According to an active seat belt apparatus and a method of operating the same of the present invention, there are one or more effects as follows:

First, when the belt parking is stopped by a passenger, the belt parking is consistently stopped regardless of the situation.

Second, a tension sensor is not provided in a seat belt retractor, so that the number of parts is reduced and manufacturing cost is saved.

Third, an additional diagnosis circuit is not included so that light weight may be achieved.

The effects of the present invention are not limited to the aforementioned effects, and other effects, which are not mentioned above, will be apparently understood by the person skilled in the art from the recitations of the claims.

DETAILED DESCRIPTION

Figure 1:
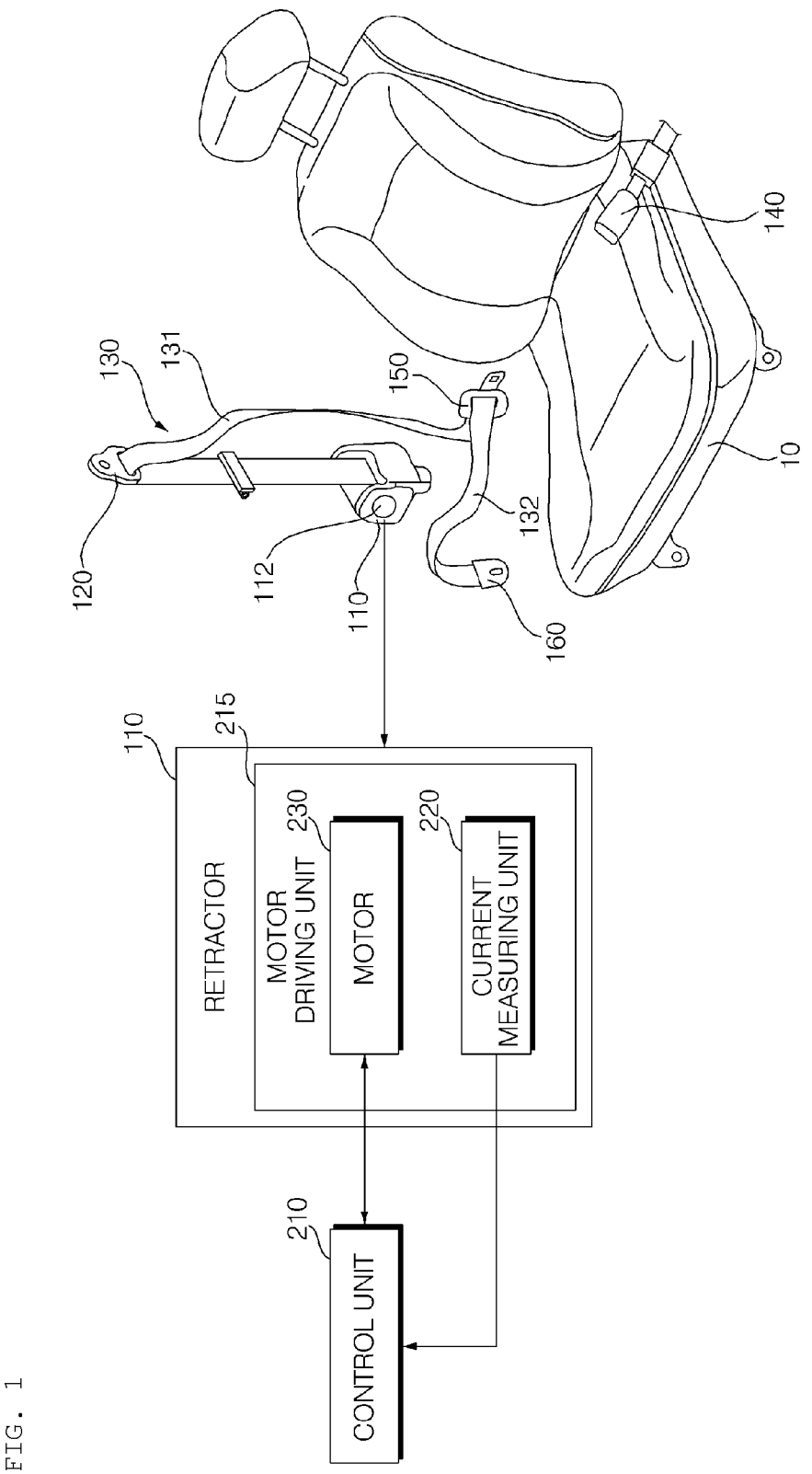
FIG. 1 is a view schematically illustrating a configuration of an active seat belt apparatus according to an exemplary embodiment of the present invention.

Advantages and characteristics of the present invention, and a method of achieving the advantages and characteristics will be clear by referring to exemplary embodiments described below in detail together with the accompanying drawings. However, the present invention is not limited to exemplary embodiment disclosed herein but will be implemented in various forms. The exemplary embodiments introduced herein are provided to make disclosed contents thorough and complete and sufficiently transfer the spirit of the present invention to those skilled in the art. Therefore, the present invention will be defined only by the appended claims. Like reference numerals indicate like elements throughout the specification.

Hereinafter, the present invention will be described with reference to the drawings for explaining an active seat belt apparatus and a method of operating the same according to exemplary embodiments of the present invention.

Such as "module" and a "unit", suffixes for components used in the following description are given or mixed and used by considering only easiness in preparing a specification and do not have a meaning or role distinguished from each other in themselves.

FIG. 1 is a view schematically illustrating a configuration of an active seat belt apparatus according to an exemplary embodiment of the present invention.

Referring to FIG. 1, an active seat belt apparatus includes a retractor 110 including a motor driving unit 215, an upper anchor 120, a webbing 130, a webbing reel 112, a buckle 140, and a tongue plate 150.

The retractor 110 is fixed to a lower end of a center pillar (not illustrated), the webbing 130 is wound around the webbing reel 112 which is rotatably provided in the retractor 110, and the webbing reel 112 is connected to a clutch (not illustrated) so as to interwork with a rotary shaft of the motor 230. Therefore, a restrictive force of the seat belt may be controlled by rotating the motor 230.

The retractor 110 may include the motor driving unit 215. The motor driving unit 215 may include a motor 230 and a current measuring unit 220. The current measuring unit 220 measures a current value of the motor driving unit 215 and transmits the measured current value to the control unit 210.

The retractor 110 may include a clutch (not illustrated). The clutch (not illustrated) transmits a driving force of the motor 230 to the webbing reel 112 to lead the webbing 130 into/out from the retractor 110. The webbing 130 is led out from the retractor 110 to be inserted into the upper anchor 120 which is fixed to the upper end of the center pillar and fastened by the buckle 140 and the tongue plate 150 which are provided at a lower side of the seat 10 to secure the passenger.

The webbing 130 which supports the passenger includes a chest belt 131 which supports a chest of the passenger in a diagonal direction and a waist belt 132 which supports a waist of the passenger and one end of the waist belt 132 is fixed to the lower anchor 160 and the lower anchor 160 is fixed to a side of the seat 10 or a lower end of the center pillar.

The active seat belt is maintained to be loose while the vehicle is being driven so that the passenger moves but when the control unit 210 determines that a status of the vehicle is dangerous, the control unit 210 controls to drive the motor 230 and controls the restrictive force of the active seat belt.

For example, even when a tension is generated in the seat belt which secures the passenger due to crash, rear-end collision, and sudden speed reduction of the vehicle so that the seat belt is rapidly led out, the rotation of the motor 230 is controlled so that the seat belt is not led out any more. By doing this, the seat belt supports the passenger to prevent the passenger from leaning to the front.

The active seat belt may include a belt parking function. The belt parking function is a function of automatically winding the seat belt when the seat belt is unfastened after the passenger fastens the seat belt into the buckle 140. The belt parking function may further include a function of stopping winding the seat belt when the passenger grasps the belt to refasten the seat belt in the middle of winding the seat belt.

The motor 230 may be driven to fasten or unfasten the active seat belt.

When the clutch (not illustrated) is closed, the motor 230 transmits a driving force to the webbing reel 112 to lead the webbing 130 into/out from the retractor 110. The restrictive force of the seat belt may be controlled by rotating the motor 230.

The motor driving unit 215 may be configured by a circuit which includes the motor 230. The motor driving unit 215 may drive the motor 230.

The current measuring unit 220 measures a value of a current of the motor driving unit 215 in order to determine whether to perform the belt parking function or stop the belt parking function when the active seat belt is unfastened.

The control unit 210 compares the current value which is measured by the current measuring unit 220 with a limit current value to determine whether to perform or stop the belt parking function.

The limit current value is a current value which is a reference to determine whether to perform or stop the belt parking function and may be determined by a car manufacturing company, a car parts manufacturing company, or a car A/S company.

When the current value which is measured by the current measuring unit 220 is smaller than the limit current value, a signal for performing the belt parking function is sent to the motor 230. The motor 230 is driven to perform the belt parking function and the belt parking function is completed. When the current value which is measured by the current measuring unit 220 is larger than the limit current value, a signal for stopping the belt parking function is sent to the motor 230. The motor 230 is not driven in order to stop the belt parking function and the belt parking function is stopped.

When the current value which is measured by the current measuring unit 220 is larger than the limit current value, if the seat belt is unfastened and then refastened, the passenger grasps the seat belt so that the tension may be increased.

Figure 2:
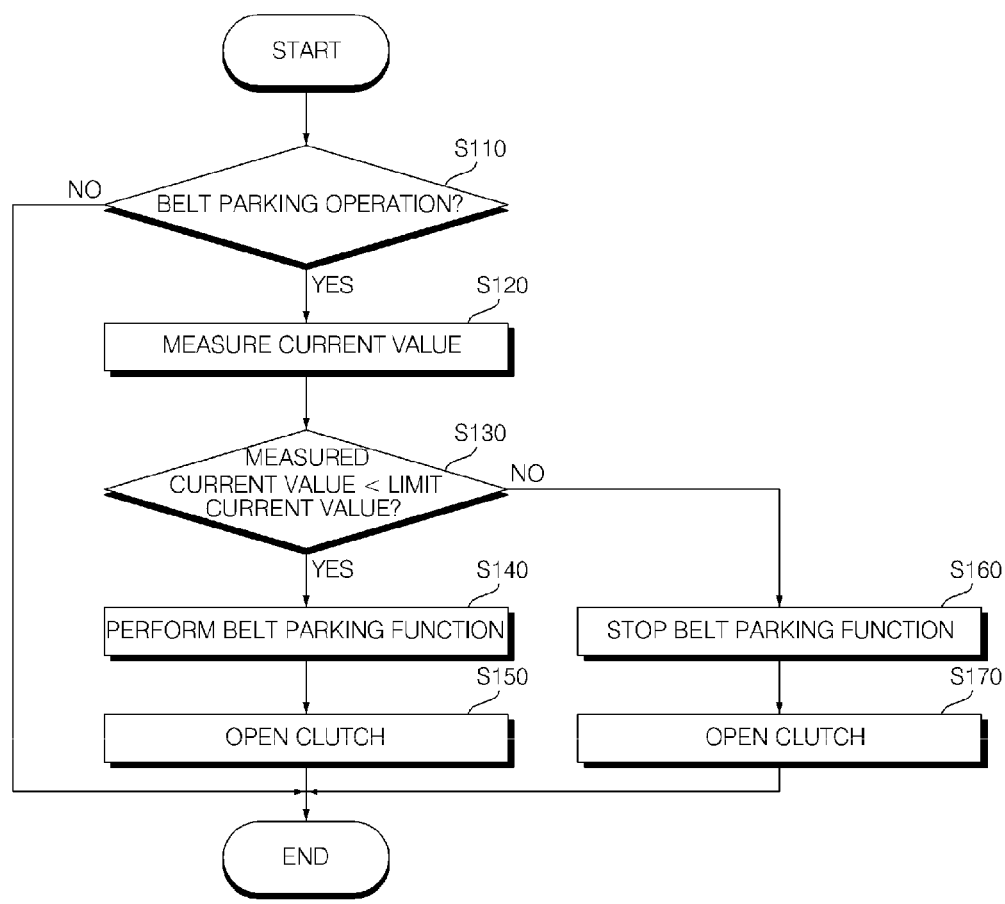
FIG. 2 is a flowchart of a belt parking procedure according to an exemplary embodiment of the present invention.

FIG. 2 is a flowchart of a belt parking procedure according to an exemplary embodiment of the present invention.

Referring to FIG. 2, the control unit 210 determines whether an operation is a belt parking operation in step S110. When the operation is the belt parking operation, the current measuring unit 220 measures a current of the motor driving unit 215 in step S120. The control unit 210 compares the current value which is measured in the current measuring unit 220 with a limit current value in step S130. When the current which is measured in the current measuring unit 220 is smaller than the limit current value, a belt parking function is performed in step S140. When the belt parking operation ends, a clutch (not illustrated) is open in step S150. The clutch (not illustrated) is open so that no driving force is transmitted from the motor 230 to the webbing reel 112. When the current value which is measured in the current measuring unit 220 is not smaller than the limit current value, the belt parking function is stopped in step S160. When the belt parking function is completely stopped, the clutch (not illustrated) is open in step S170. The clutch is open so that no driving force is transmitted from the motor 230 to the webbing reel 112.

Figure 3A:
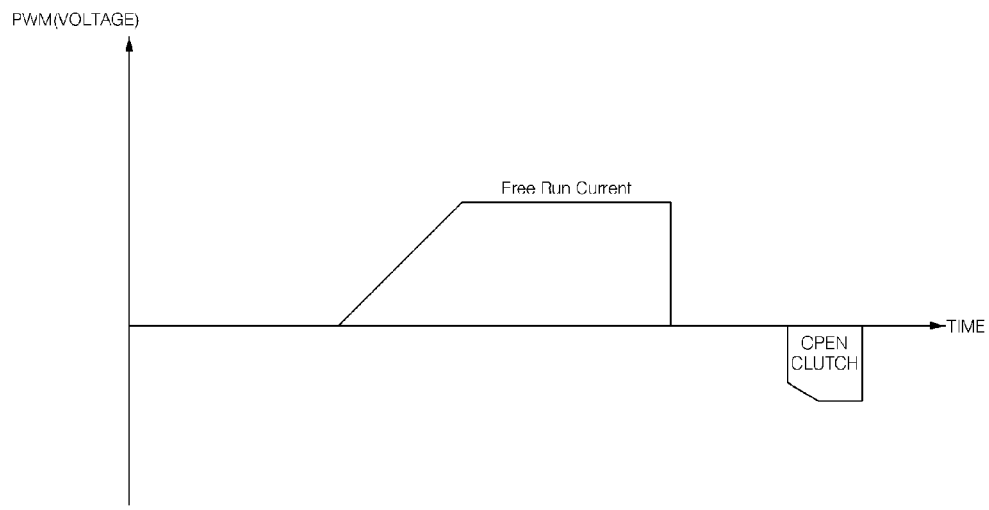
FIG. 3A is a belt parking function operating profile according to an exemplary embodiment of the present invention.

FIG. 3A is a belt parking function operating profile according to an exemplary embodiment of the present invention.

Referring to FIG. 3A, a PWM ratio which is a pulse width modulation (PWM) value is applied and a free run current is output so that the belt parking function is performed. When the belt parking operation ends, a clutch (not illustrated) is open. When the clutch is open, no driving force is transmitted from the motor 230 to the webbing reel 112. Here, the free run current means a current which is output by inputting only a value of PWM ratio under open loop control. The motor 230 is driven without inputting a load to wind the webbing 130 by the webbing reel 112.

Figure 3B:
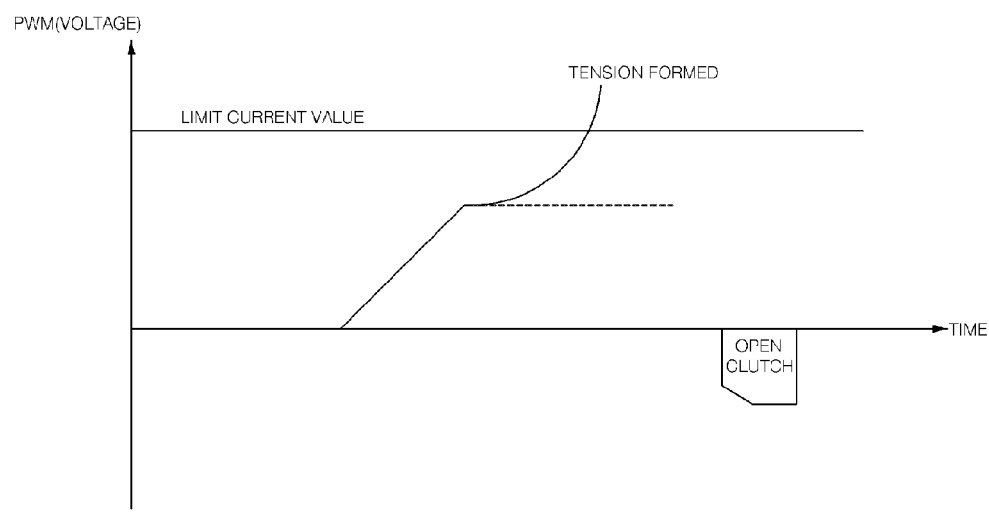
FIG. 3B is a belt parking function stopping profile a according to an exemplary embodiment of the present invention.

FIG. 3B is a belt parking function stopping profile according to an exemplary embodiment of the present invention.

Referring to FIG. 3B, when the passenger grasps the seat belt to fasten the seat belt again while the belt parking function is performed to wind the webbing by the webbing reel 112, a tension is performed. If a current value which is increased by the tension is not smaller than the limit current value, the belt parking function is stopped. When the belt parking function is completely stopped, the clutch (not illustrated) is open. When the clutch is open, no driving force is transmitted from the motor 230 to the webbing reel 112.

Figure 4:
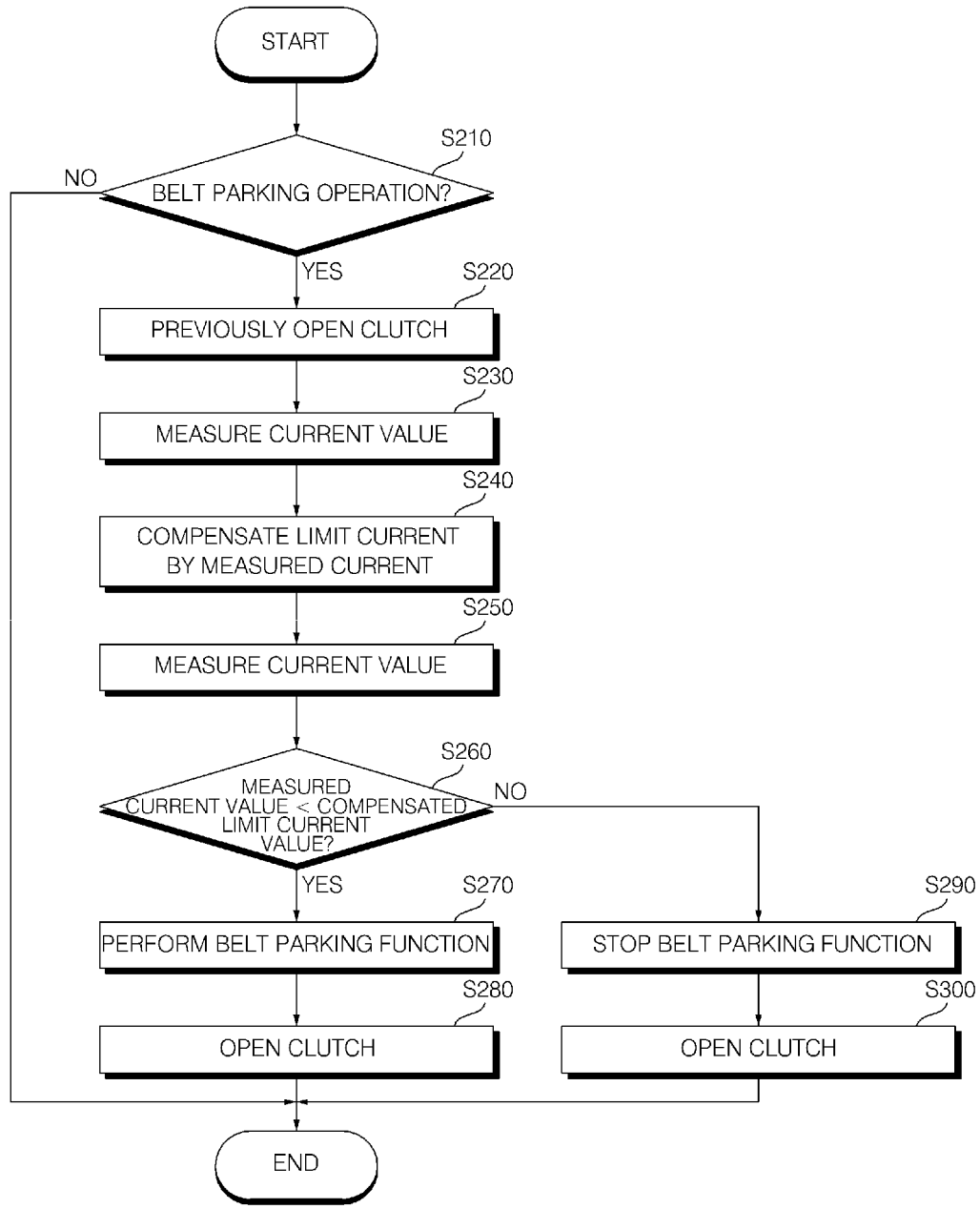
FIG. 4 is a flowchart of a belt parking procedure according to an exemplary embodiment of the present invention.

FIG. 4 is a flowchart of a belt parking procedure according to an exemplary embodiment of the present invention.

Referring to FIG. 4, the control unit 210 determines whether an operation is a belt parking operation in step S210. When the operation is the belt parking operation, the current measuring unit 220 measures a prior current value of the motor driving unit 215 in step S230. The prior current value is a value obtained by measuring a current which flows into the motor driving unit 215 before the controller 210 determines whether to perform or stop the belt parking function. The control unit 210 compensates the limit current value using the prior current value in step S240. In this case, the compensated limit current value may be determined by adding or subtracting a calibrated user defined compensation value of a tester. The prior current value may be a current value which is measured when the motor 230 is driven in a reverse direction and does not affect an operation of the seat belt. The current measuring unit 220 measures the current value of the motor driving unit 215 in step S250. The control unit 210 compares the measured current value with the compensated limit current value in step S260. When the current value which is measured by the current measuring unit 220 is smaller than the limit current value, the control unit 210 sends a signal for performing the belt parking function to the motor 230 and performs the belt parking function in step S270. When the belt parking operation is completed, the clutch (not illustrated) is open in step S280. The clutch is open so that no driving force is transmitted from the motor 230 to the webbing reel 112. When the current value which is measured by the current measuring unit 220 is not smaller than the compensated limit current value, the control unit 210 sends a signal for stopping the belt parking function to the motor 230 and the belt parking function is stopped in step S290. When the belt parking function is completely stopped, the clutch (not illustrated) is open in step S300. When the clutch is open, no driving force is transmitted from the motor 230 to the webbing reel 112.

Figure 5A:
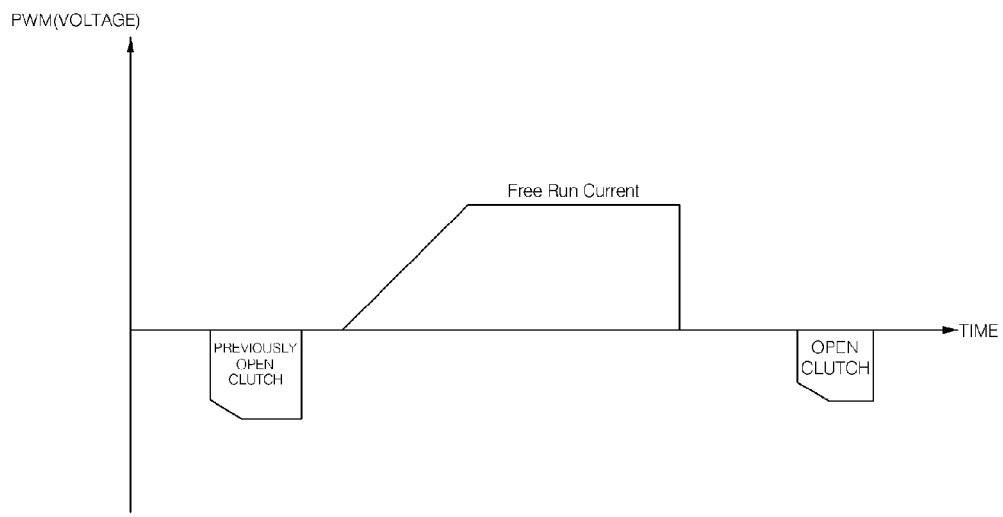
FIG. 5A is a belt parking function operating profile according to an exemplary embodiment of the present invention.

When the prior current value is measured by the current measuring unit 220, an output current value may be estimated in advance. That is, even when an amount of current which is output in response to the change of external environment is not constant, the limit current value is compensated from the prior current value so that the belt parking function may be performed or stopped regardless of the change of external environment. The change of external environment may be a change in accordance with a motor internal resistance, a lead wiring resistance, and an ECU internal resistance. FIG. 5A is a belt parking function operating profile according to an exemplary embodiment of the present invention.

Figure 5B:
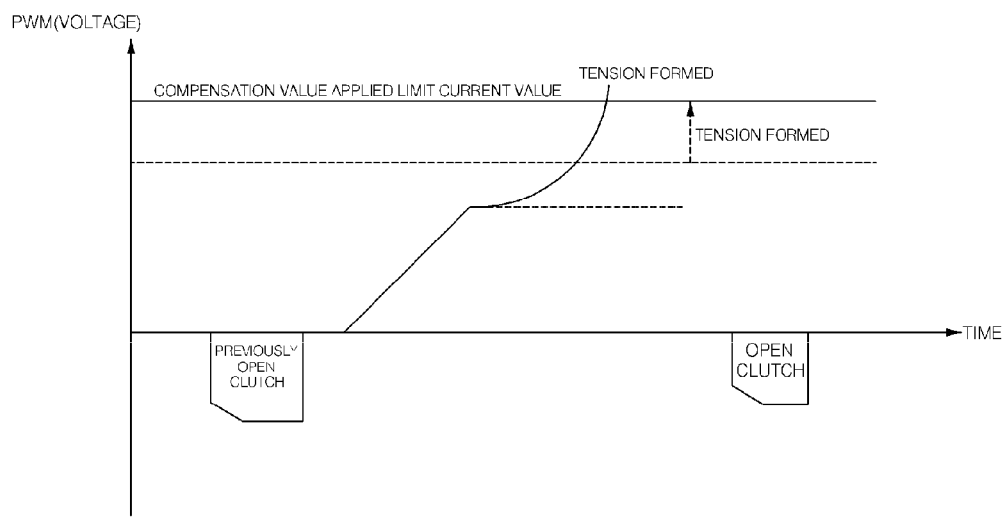
FIG. 5B is a belt parking function stopping profile according to an exemplary embodiment of the present invention.

Referring to FIG. 5A, the clutch (not illustrated) is open in advance. Before performing the belt parking function, the motor 230 is driven in advance (for example, a PWM ratio is applied in advance) to estimate how much the free run current is output in advance. The limit current value is compensated by the estimated free run current. The free run current is output by the PWM ratio which is a PWM value so that the belt parking function is performed. When the belt parking operation ends, a clutch (not illustrated) is open. The clutch is open so that no driving force is transmitted from the motor 230 to the webbing reel 112. FIG. 5B is a belt parking function stopping profile according to an exemplary embodiment of the present invention.

Referring to FIG. 5B, the clutch (not illustrated) is open in advance. Before performing the belt parking function, the motor 230 is driven in advance (for example, the PWM ratio is applied in advance to estimate how much the free run current is output in advance. The limit current value is compensated by the estimated free run current. When the passenger grasps the seat belt to fasten the seat belt again while the belt parking function is performed to wind the webbing by the webbing reel 112, a tension is performed. If a current value which is increased by the tension is not smaller than the compensated limit current value, the belt parking function is stopped. When the belt parking function is completely stopped, the clutch (not illustrated) is open. When the clutch (not illustrated) is open, no driving force is transmitted from the motor 230 to the webbing reel 112.

The vehicle may include the above-described active seat belt apparatus. The vehicle may be an internal combustion engine vehicle, an electric vehicle, a hybrid vehicle, a hydrogen fuel vehicle, or a solar-powered vehicle.

Preferred embodiments of the present invention have been illustrated and described above, but the present invention is not limited to the above-described specific embodiments, it is obvious that various modification may be made by those skilled in the art, to which the present invention pertains without departing from the gist of the present invention, which is claimed in the claims, and such modification should not be individually understood from the technical spirit or prospect of the present invention.

What is claimed is:

1. An active seat belt apparatus, comprising:
   a motor which is driven to fasten or unfasten an active seat belt;
   a motor driving unit which drives the motor;
   a current measuring unit which measures a value of a current of the motor driving unit in order to determine whether to perform or stop a belt parking function when the active seat belt is unfastened; and
   a control unit which i) sends a signal for performing the belt parking function to the motor to wind the active seat belt when the active seat belt is unfastened and the value of the current measured by the current measuring unit is smaller than a limit current value, and ii) sends a signal for stopping the belt parking function to the motor to stop winding the active seat belt when the active seat belt is unfastened and the value of the current measured by the current measuring unit while the motor winds the active seat belt is larger than the limit current value.

2. The active seat belt apparatus of claim 1, further comprising:
   a retractor which includes the motor driving unit;
   a webbing reel which is rotatably provided in the retractor; and
   a clutch which transmits a driving force from the motor to the webbing reel and is controlled by the control unit.

3. The active seat belt apparatus of claim 2, wherein the control unit applies a control signal to the clutch in response to the signal for performing the belt parking function or the signal for stopping the belt parking function.

4. An active seat belt apparatus, comprising:
   a motor which is driven to fasten or unfasten an active seat belt;
   a motor driving unit which drives the motor;
   a current measuring unit which measures a value of a current of the motor driving unit in order to determine whether to perform or stop a belt parking function when the active seat belt is unfastened; and
   a control unit which sends a signal for performing the belt parking function to the motor when the value of the current measured by the current measuring unit is smaller than a limit current value and sends a signal for stopping the belt parking function to the motor when the value of the current measured by the current measuring unit is larger than the limit current value,
   wherein the control unit compensates the limit current value by a prior current value which is measured in the current measuring unit, sends a signal for performing the belt parking function to the motor when the value of the current measured by the current measuring unit is smaller than the compensated limit current value and sends a signal for stopping the belt parking function to the motor when the value of the current measured by the current measuring unit is larger than the compensated limit current value.

5. The active seat belt apparatus of claim 4, wherein the compensated limit current value is determined by adding or subtracting a calibrated user defined compensation value of a tester.

6. The active seat belt apparatus of claim 4, wherein the prior current value is a value which is measured by the current measuring unit by driving the motor in a reverse direction.

7. The active seat belt apparatus of claim 4, further comprising:
   a retractor which includes the motor driving unit;
   a webbing reel which is rotatably provided in the retractor; and
   a clutch which transmits a driving force from the motor to the webbing reel and is controlled by the control unit.

8. The active seat belt apparatus of claim 7, wherein the control unit applies a control signal to the clutch in response to the signal for performing the belt parking function or the signal for stopping the belt parking function.

9. A method of operating an active seat belt apparatus, comprising:
   measuring a current of a motor driving unit when a belt parking operation is performed;
   comparing the measured current value with a limit current value;
   performing a belt parking function to wind a seat belt when the active seat belt is unfastened and the measured current value is smaller than the limit current value; and
   stopping the belt parking function to stop winding the seat belt when the active seat belt is unfastened and the current value measured while the motor winds the seat belt is larger than the limit current value.

10. The method of claim 9, further comprising:
    before the performing of a belt parking operation, measuring a prior current value which flows into a motor driving unit;
    wherein the limit current value is compensated by the prior current value.

11. The method of claim 10, wherein the limit current value is determined by adding or subtracting a calibrated user defined compensation value of a tester.

12. The method of claim 10, wherein in the measuring of a prior current value, a current value when a motor which is included in the motor driving unit is driven in a reverse direction is measured.

* * * * *